United States Patent [19]

Davis et al.

[11] Patent Number: 4,975,693

[45] Date of Patent: Dec. 4, 1990

[54] PROGRAMMABLE MULTI-ADDRESS PAGER RECEIVER AND METHOD OF CHARACTERIZING SAME

[75] Inventors: Walter L. Davis, Coral Springs; George Drapac; Stephen H. Woltz, both of Boca Raton, all of Fla.

[73] Assignee: Motorola, Inc., Schaumburg, Ill.

[21] Appl. No.: 303,889

[22] Filed: Jan. 30, 1989

[51] Int. Cl.$^5$ .......................... G08B 5/22; H04Q 3/02
[52] U.S. Cl. .......................... 340/825.44; 340/825.45; 340/825.47; 340/825.48
[58] Field of Search ...................... 455/38; 340/825.44, 340/825.45, 825.46, 825.47, 825.48, 384 E, 311.1, 825.37

[56] References Cited

U.S. PATENT DOCUMENTS

| | | | |
|---|---|---|---|
| 4,160,240 | 7/1979 | Partipilo | 340/825.37 X |
| 4,370,753 | 1/1983 | Ehmke | 340/825.48 X |
| 4,403,212 | 9/1983 | Masaki | 340/825.48 X |
| 4,419,668 | 12/1983 | Ganucheau, Jr. | 455/38 X |
| 4,591,853 | 5/1986 | Mori | 340/825.44 |
| 4,682,165 | 7/1987 | Davis | 340/825.44 X |

FOREIGN PATENT DOCUMENTS 8201268 4/1982 World Int. Prop. O. ........ 340/311.1

OTHER PUBLICATIONS

"PMR 2000" Series GSC Alphanumeric Display Personal Message Receiver Instruction Manual, 68P81048C70-0, Motorola, Inc., 12/1986.

Primary Examiner—Ulysses Weldon
Attorney, Agent, or Firm—William E. Zitelli; Vincent B. Ingrassia; William E. Koch

[57] ABSTRACT

The pager receiver including a conventional address decoder, an alert envelope waveform generator, and an alert function mapper is disclosed. The pager is individually and uniquely characterized by programming the alert function mapper to govern the generation of assigned alert annunciation patterns by the waveform generator in response to selected decoded pager addresses and associated functions thereof, and to inhibit alert generation by the waveform generator in response to non-selected decoded pager addresses and associated functions thereof. In one embodiment, the alert signal waveform generator is enabled to respond to the alert function mapper only when the pager address is decoded by the decoder.

8 Claims, 2 Drawing Sheets

PROGRAMMABLE MULTI-ADDRESS PAGER RECEIVER AND METHOD OF CHARACTERIZING SAME

COPENDING U.S. APPLICATION

The U.S. patent application entitled "System for Off-the-Air Reprogramming of Communications Receivers", bearing Ser. No. 07/116,948, filed 6/11/87 now U.S. Pat. No. 4,910,510, and assigned to the same assignee as the instant application is referenced herein as a source, when issued, for providing details of a pager receiver having a multi-address decoder suitable for use in the embodiment of the present invention.

BACKGROUND OF THE INVENTION

The present invention relates to pager receivers in general, and more particularly, to a programmable multi-address pager receiver and method of characterizing same for governing the operation of alert annunciation in response to decoded pager call addresses and address functions associated therewith. In a conventional paging system, one or more centrally located transmitting stations transmit pager call information in a conventional protocol format, such as POCSAG or Golay Sequential Code, for example. Included in the transmitted signalling format are the selective call addresses of the individual pager receivers designated to receive the pager calls. Some pager receivers are programmed with only one selective call address and respond accordingly to alert the user when that address is decoded from the received signalling. Others are multi-address receivers, similar to the type described in the above-referenced copending application, for example, which are programmed to decode two or more selective call addresses and alert the user to each decoded call address. In addition, the conventional protocol formats permit multiple address functions with each decoded call address. POCSAG and Golay, for example, permit four address functions with each call address.

Pager receivers of the tone-only type include an alert generation circuit for generating either an audio, tactile, or visual signal at an assigned annunciation pattern. For example, the Motorola pager receiver, Model #RC14A, is capable of decoding four call addresses with each address being assigned any one of 128 different alert patterns. Thus, when an address is decoded by the RC14A decoder, the alert generator is enabled to generate the alert signal at the assigned annunciation pattern. This capability poses special problems in that humans have difficulty in discriminating between more than six or eight audible or visual alert patterns.

Another Motorola pager receiver, Model PMR 2000®, is operative in either the Golay or POCSAG protocols to decode either of two preprogrammed call addresses as well as the corresponding four address functions associated with each call address. The PMR 2000® model pager has alert patterns preassigned correspondingly to the address functions such that once a call address is decoded, the preassigned alert pattern is generated. Accordingly, a further problem is posed in that a typical user may have no need to be alerted to all of the four functions associated with a POCSAG or Golay call address. The caller may only need to be alerted to a sub-set of the decoded addresses and of the functions of each decoded call address.

This latter situation comes about because of the need to be able to simultaneously alert pager members of groups—the so called "group call" feature—while retaining the ability to selectively signal each person of the group individually. For example, a doctor would need one or more individual calls associated with his private practice, and might also need to be alerted to calls to assemble the "Code Blue" emergency team in a hospital, but not to calls for the hospital's fire or disaster teams. Further, in the United States, radio common carriers are reluctant to allow POCSAG pager users to use more than one or two of the four POCSAG address functions because the carrier must provide a telephone access number for each operable function.

While the aforementioned pager receivers which are the closest known technology, provide different alert patterns for each address function, and provide assignable patterns, they do not provide for totally arbitrary assignment of alerts to a large number of address functions while disabling the functions that are not assigned alert patterns. Thus, it is clearly desirable to have pager receiver which permits a specific alert pattern from a limited set of alert patterns to be associated to any address function in a multi-address pager. In addition, a pager receiver which responds to any arbitrary combination of address functions, and conversely, permits no response to any arbitrary sub-set of the address functions that the pager decodes is also believed needed. Still further, it is desirable to have a multi-address selective call receiver which assigns specific alert patterns to arbitrarily selected addresses, while simultaneously disabling the alert generating circuitry in response to other functions of the same call addresses.

The present invention, an embodiment of which being described in the following sections utilizing the accompanying drawings, proposes to solve the aforementioned problems by:

individually assigning address functions to generate alert signalling with a specific one of a limited number of alert annunciation patterns, allowing a pager receiver to respond to arbitrary sub-sets of the address functions associated with a POCSAG call address, for example, providing the ability to form arbitrary groups (i.e. have any person respond to any group alert) with each pager receiver generating the same alert pattern to the group call signal, and allowing the pager receiver to not respond to address functions not assigned an alert signalling pattern.

SUMMARY OF THE INVENTION

In accordance with the present invention, a pager receiver is characterized for governing the operation of alert annuciation in response to decoded pager addresses from received pager signals using a method comprising the steps of: decoding any one of a plurality of the predetermined pager addresses and generating a first digital word having a code uniquely corresponding to the decoded pager address; decoding any one of a plurality of address functions associated with the decoded pager address and generating a second digital word having a code uniquely corresponding to the decoded address function; selecting a subset of combined codes of the first and second digital words from the set of all coded first and second digital words by assigning a pattern code selected from a limited plurality of pattern codes to each member of the subset; generating an alert signal in response to a generated first digital word and a generated second digital word having a combined code which is a member of the subset with an annunciation pattern corresponding to the assigned pattern code thereof; and inhibiting alert signal generation in response to a generated first digital word and a generated second digital word having a combined code which is not a member of the subset.

In accordance with one method embodiment of the invention, the step of selecting includes the steps of: correlating registers of a memory on a one-to-one basis with the combined codes of all of the coded first and second digital words such that the contents of each memory register may be accessed uniquely by its corresponding combined code; and selecting combined codes for the subset by programming the memory registers corresponding thereto with their correspondingly assigned pattern codes. Accordingly, an alert signal may be generated only when a combined code accesses a memory register programmed with an assigned pattern code and shall be generated with an annunciation pattern corresponding to the accessed pattern code. Further, the method step of inhibiting may include the step of programming the memory registers corresponding to unselected combined codes with an unassigned pattern code. Still further, the above method may include the step of enabling alert signal generation only when a pager address is decoded.

In accordance with an apparatus embodiment of the present invention, a multi-address pager receiver may include non-volatile memory means for coupling to a decoder and an alert signal generating means of the receiver. The decoder operates to decode any one of a plurality of predetermined pager addresses from the received pager signals and generates the first and second digital words with their unique codes. The alert signal generating means generates an alert signal having an annunciation pattern corresponding to the assignment code of a third digit word governing such generation, such means being rendered non-responsive when governed by an inhibit code of the third digital word. Each register of the plurality of registers of the non-volatile memory means is pager programmable to store a coded word representing one of either an assignment code or an inhibit code. The programmed code of each register is uniquely accessible as a coded third digital word by the code of the combined first and second digital words for governing the operation of the alert signal generating means. Accordingly, the pager may be individually and uniquely characterized by the programming of the non-volatile memory means to generate assigned alert annunciation patterns in response to selected decoded pager addresses and associated functions thereof and to inhibit alert generation in response to non-selected decoded pager addresses and associated functions thereof.

In yet another embodiment, the pager receiver may include means for enabling the alert signal generating means responsive to the coded third digital word only when a pager address is decoded by the decoder.

DESCRIPTION OF THE PREFERRED EMBODIMENT

Figure 1:
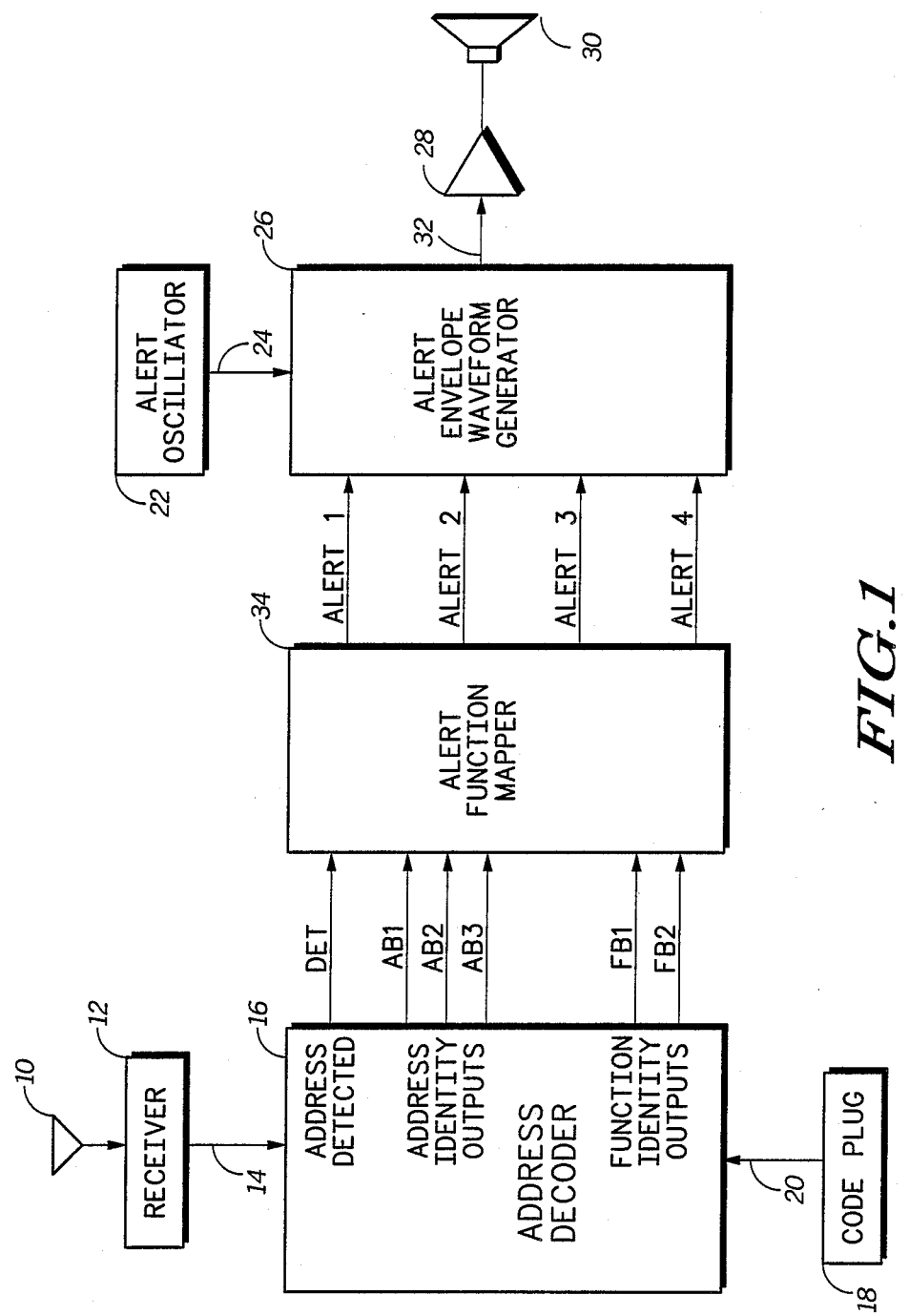
FIG. 1 is a block diagram schematic of a multi-address pager receiver suitable for embodying the principles of the present invention.

Transmitted pager call signalling in one or more of the conventional pager protocol formats, such as POCSAG or Golay, for example, is received by a conventional pager receiver such as that depicted by the block diagram schematic of FIG. 1 at the antenna 10 thereof. Referring to FIG. 1, the transmitted signals are conducted from the antenna 10 to a receiver unit 12 which includes one or more sections for performing conventional heterodyning, and frequency discriminating operations for recovering the information content of the transmitted signals. The converted received signals are conducted over signal line 14 to a conventional address decoder unit 16 which is operative to decode therefrom any one of a plurality of predetermined pager addresses and any one of a plurality of address functions associated therewith. The predetermined pager addresses may be preprogrammed in a code plug 18 of the pager receiver and conducted to the address decoder 16 over signal line 20 as needed.

For the present embodiment, the address decoder 16 may be a microprocessor-based system operative in accordance with one or more sets of algorithmic instructions to perform the foregoing described multi-address, multi-address function decoding processes. The Motorola instruction manual entitled "PMR 2000 TM Series" and bearing publication number 68P81048C70-0 which has been in circulation since 1986 is incorporated by reference herein to provide a more detailed description of operation with block diagram and circuit schematic illustrations of a typical microprocessor-based receiver pager; refer especially to pages 1-19 and 32 thereof. A copy of the instruction manual may be obtained from the Motorola Paging Division, 1500 NW 22 Avenue, Boynton Beach, Fla. 33426-8753. In addition, the above referenced copending application bearing serial number 07/116,948, assigned to Motorola, Inc., is also incorporated by reference herein to provide a description of the programming of a microprocessor-based decoder system using flow chart illustrations including the details of multi-address and multi-address function decoding operations. None of the methods and/or apparatus used by the aforementioned references in connection with performing the multi-address operations are considered covered per se by the appended claims of the instant application.

The address decoder 16 of the preferred embodiment has the capability of decoding pager addresses up to a plurality of eight and generates a first digital word comprising the binary bit lines AB1, AB2, and AB3 with a binary code uniquely corresponding to the decoded pager address. In addition, the address decoder 16 of the present embodiment has the capability of decoding up to a plurality of four address functions and generates a second digital word comprising the binary bit lines of FB1 and FB2 with a binary code uniquely corresponding to the decoded address function. Still further, the address decoder 16 is operative to generate an address detect signal over the signal line denoted as DET in response to the event of decoding any one of the predetermined pager addresses from the received pager signals.

The receiver pager embodiment depicted in FIG. 1 also includes an alert signal generating system comprising an alert oscillator 22 which generates a frequency signal which is conducted over a signal line 24 to a conventional alert envelope waveform generator 26. The waveform generator 26 is governed by a third digital word, comprising four bit lines denoted as ALERT 1 through ALERT 4, to generate one of a plurality of alert annuciation envelope waveform patterns of the frequency signals 24 which ay be used to drive either an audio, tactile, or visual annunciator. The present embodiment includes an audio annunciator comprising the elements of an audio amplifier 28 which drives a conventional speaker 30 in accordance with the annunciation pattern signal conducted over signal line 32. In a similar manner, the pattern signal 32 may also drive either an eccentrically configured motor system for providing tactile vibrations or a simple visual lamp, both conventionally used in pager receivers, without deviating from the broad principles of the present invention.

Figure 2:
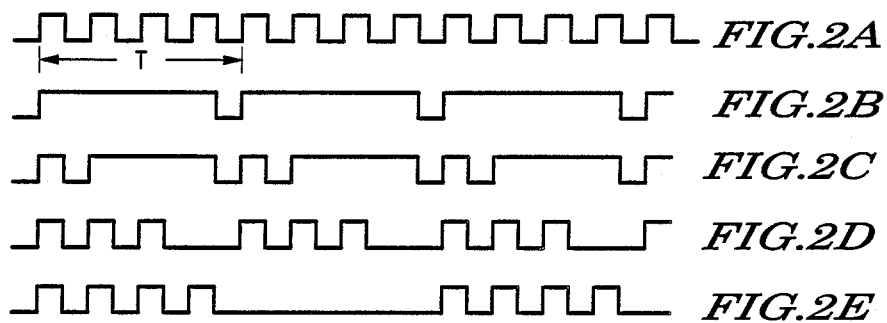
FIG. 2 exemplifies waveform patterns which may be generated by the waveform generator of the pager receiver embodiment depicted in FIG. 1.

In operation, the alert envelope waveform generator 26 generates envelope waveform patterns to conduct or not conduct the oscillator signal 24 through to the annunciator 28–30 via signal line 32. Four such envelope waveforms patterns suitable for operation by the waveform generator 26 are shown by the waveforms B–E of FIG. 2. A clock signal exemplified by the waveform A of FIG. 2 may be generated internally by the waveform generator 26 in order to govern the timing of the generated waveform patterns shown by the waveforms B–E. In the present embodiment, the waveforms are repetitive over a period T which covers eight increments of time of the clock A. For example, waveform pattern B which may be selected by the digital bit ALERT 1 of the third digital word passes the oscillator frequency to the annunciator over ⅞ of the repetitive period and inhibits it for ⅛ of the time of each period. The other waveform patterns C, D, and E as illustrated in FIG. 2 may be selected respectively by the bit signals ALERT 2, ALERT 3, and ALERT 4 of the third digital word to conduct and inhibit the oscillator signal to the annunciator 28–30. In this manner, a pager user may be able to determine the source of a page call received by the pattern of the alert annunciation.

Figure 3:
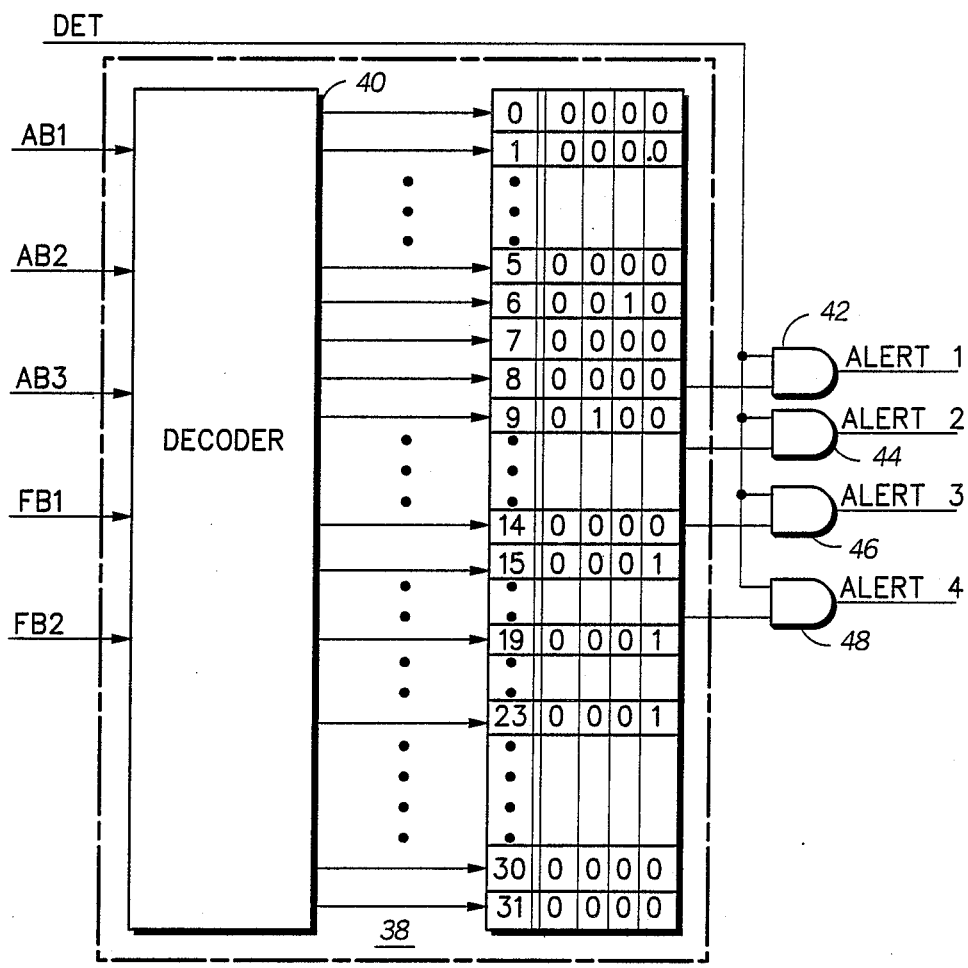
FIG. 3 is an illustration of an alert function mapper module suitable for use in the pager receiver embodiment shown in FIG. 1.

In accordance with the present invention, a programmable alert function mapper unit 34 is coupleable to both of the address decoder 16 and waveform generator 26. The mapper module 34 may include a non-volatile memory unit containing a plurality of storage registers such as that depicted in the dot-dash block 38 of FIG. 3. In the present embodiment, registers of the memory 38 denoted by the addresses 0–31 are correlated on a one-to-one basis with the combined codes of all of the coded first and second digital words, i.e. AB1, AB2, AB3, FB1, and FB2. Decoder circuitry 40 of the memory module 38 decodes the combined code of the first and second digital words such that the contents of each memory register may be accessed uniquely by the its corresponding combined code. This is illustrated in FIG. 3 and also in the Table 1 found directly herebelow.

TABLE 1

| Pager Address | Address Function | Memory Register |
|---|---|---|
| A1 (000) | F1 (00) | 0 00000 |
|  | F2 (01) | 1 00001 |

TABLE 1-continued

| Pager Address | Address Function | Memory Register |
|---|---|---|
|  | F3 (10) | 2 00010 |
|  | F4 (11) | 3 00011 |
| A2 (001) | F1 (00) | 4 00100 |
|  | F2 (01) | 5 00101 |
| . |  |  |
| . |  |  |
| A7 (110) | F3 (10) | 26 11010 |
|  | F4 (11) | 27 11011 |
| A8 (111) | F1 (00) | 28 11100 |
|  | F2 (01) | 29 11101 |
|  | F3 (10) | 30 11110 |
|  | F4 (11) | 31 11111 |

Accordingly, a sub-set of combined codes of the address and associated address functions may be selected from the set of all decoded first and second digital words by assigning a pattern code selected from the limited plurality of pattern codes as described in connection with the waveform generator 26 hereabove to each member of the sub-set. This is accomplished in the present embodiment by programming the memory registers corresponding to the members of the sub-set with their correspondingly assigned pattern codes. Consequently, an alert signal may be generated only when a combined code accesses a memory register programmed with an assigned pattern code and with an annunciation pattern corresponding to the accessed pattern code. In a similar manner, the registers corresponding to the combined codes excluded from the sub-set selection may be programmed with an inhibit code which in the present embodiment is represented by all binary zeros.

According to the foregoing described technique, each pager receiver may be individually and uniquely characterized in its alert annunciation response to decoded address and address functions by the programming of the non-volatile memory unit to generate assigned alert annunciation patterns in response to selected decoded pager addresses and associated functions thereof and to inhibit alert generation in response to non-selected decoder pager addresses and associated functions thereof.

A more detailed description of this technique is provided in connection with the characterization example illustrated in the Tables 2 and 3 shown directly herebelow.

TABLE 2

| ALERT CHARACTERIZATION | | | | | | | | |
|---|---|---|---|---|---|---|---|---|
|  | A1 | A2 | A3 | A4 | A5 | A6 | A7 | A8 |
| F1 | P1 | I | I | I | I | I | I | I |
| F2 | I | I | P2 | I | I | I | I | I |
| F3 | I | P3 | I | I | I | I | I | I |
| F4 | I | I | I | P4 | P4 | P4 | I | I |

TABLE 3

| Code | Alert Pattern |
|---|---|
| 0000 | I |
| 1000 | P1 |
| 0100 | P2 |
| 0010 | P3 |
| 0001 | P4 |

In Table 2, the notations A1–A8 represent eight different pager addresses of a pager receiver. These addresses may be preprogrammed into the code plug 18 of the receiver and provided to the address decoder 16 for address decoding of the received signals. Similarly, the notations F1–F4 represent four address functions associated with each pager address and these address functions may be decoded by the decoder 16 in accordance with the pager signalling format of the transmitted signals once its associated pager address has been decoded. Also in Table 2, the notations P1–P4 are representative of the annunciation patterns governed by the alert signals ALERT 1 through ALERT 4, respectively, and the notation I is representative of an inhibit code which does not belong to the set of assigned pattern codes. The pattern and inhibit codes corresponding to the notations I and P1–P4 are shown in Table 3. The correlation between address and address function codes and memory registers depicted in Table 1 above shall be used in explaining the programming of the non-volatile memory module 38 to achieve the exemplary alert characterization of the pager receiver illustrated in Table 2 above.

Accordingly, in order to generate the annunciation pattern waveform P1 governed by the ALERT 1 signal when address A1 and address function F1 associated therewith is decoded, a 1 is programmed into the first bit and zeros into the other bits of the four-bit code contents of register 0. Similarly, in order to generate the annunciation pattern waveform P3 governed by alert signal ALERT 3 when the address A2 and address function F3 is decoded, a 1 is programmed into the third bit and zeros in the remaining bits of the code contents of register 6. Still further, in order to generate the pattern waveform P2 governed by the signal ALERT 2 when the address A3 and associated address function F2 is decoded, a 1 is programmed into the second bit and zeros in the remaining bits of the code contents of register 9. Still further, in order to generate the annunciation pattern P4 governed by the signal ALERT 4 when any one of the combined codes of A4, F4 or A5, F4 or A6, F4 are decoded, a 1 is programmed into the fourth bit with the remaining bits zero of the code contents of the registers 15, 19 and 23 of the memory 38. All of the other registers of the memory 38 are programmed with all zeros which, for the present embodiment, is representative of the inhibit code.

In operation, when a pager address and associated address function is decoded, the combined codes of the first and second digital words generated by the decoder in response to the decoding operation is used to access the corresponding register to provide the bits 1–4 of the code contents thereof to one input each of a set of respectively corresponding AND gates 42, 44, 46 and 48. The DET signal is coupled mutually to the other input of each of said AND gates. In this manner, the accessed pattern code may be enabled to become the code of the third digital word only when a pager address is decoded by the decoder 16 and an address detect signal DET is generated thereby. That is, the gating means comprising AND gates 42, 44, 46 and 48 is responsive to the address detect signal DET to gate the accessed pattern code from the memory 38 to the alert signal generating circuit 26 as the governing coded third digital word.

In summary, when a pager address and associated address function thereof is decoded by the decoder 16, two coded words representing the decoded address and address function are provided to the coupled, individually and uniquely programmed, memory module 34 for uniquely accessing the code contents of the register correlated therewith. Simultaneously, the DET signal is generated to enable the gating of the AND gates 42, 44, 46 and 48 to conduct the accessed code over their respective signal lines ALERT 1 through ALERT 4 to govern the waveform generator 26 to generate the desired waveform pattern in accordance with the programmed accessed code word. Should the accessed code word contain all zeros, the alert signal generator 26 is inhibited from generating any of the waveform patterns whereby no alert annunciation is provided for those addresses and associated address functions not members of the selected sub-set, i.e. not assigned pattern codes in the memory 38.

While the present embodiment has been described in connection with a hardware embodiment utilizing a non-volatile memory module programmable to characterize the alert response of an individual pager receiver and coupleable to the address decoder 16 for operation in cooperation therewith, it is understood by all those skilled in the pertinent art that an equivalent function is capable of being performed by a programmed processor, which may be part of the address decoder 16 utilizing a programmed software algorithm without deviating from the broad principles of the present invention. Accordingly, the present invention should be not limited to any single embodiment but rather construed in accordance with the breadth and scope of the appended claims.

What is claimed is:

1. A method governing the operation of alert annunciation in response to decoded pager addresses from received pager signals, said method comprising the steps of:
   (a) decoding any one of a plurality of predetermined pager addresses from received pager signals;
   (b) generating a first digital word having a code uniquely corresponding to one of said decoded pager addresses of step (a);
   (c) decoding any one of a plurality of address functions associated with said decoded pager address from received pager signals;
   (d) generating a second digital word having a code uniquely corresponding to one of said decoded address functions of step (c);
   (e) selecting a subset of combined codes of said first and second digital words from a set of all coded first and second digital words by assigning a pattern code selected from a limited plurality of pattern codes to each member of said subset;
   (f) generating an alert signal in response to the generated first digital word of step (b) and the generated second digital word of step (d) having a combined code which is a member of said subset with an annunciation pattern corresponding to the assigned pattern code thereof; and
   (g) inhibiting alert signal generation in response to the generated first digital word of step (b) and the generated second digital word of step (d) having a combined code which is not a member of said subset.

2. The method in accordance with claim 1 wherein the step of selecting includes the steps of:
   correlating registers of a memory on a one-to-one basis with the combined codes of all of the coded first and second digital words such that the contents of each memory register may be accessed uniquely by its corresponding combined code; and selecting combined codes for the subset by programming the memory registers corresponding thereto with their correspondingly assigned pattern codes, whereby an alert signal may be generated by step (f) only when a combined code accesses an assigned pattern code (step e) of a memory register and shall be generated with an annunciation pattern corresponding to the accessed pattern code.

3. The method in accordance with claim 1 wherein the step of inhibiting includes the step of programming the memory registers corresponding to unselected combined codes with an unassigned pattern code.

4. The method in accordance with claim 1 including the step of enabling alert signal generation only when a pager address is decoded by step (a).

5. A multi-address pager receiver including a receiver section for receiving pager signals, said pager receiver comprising:

a decoder for decoding any one of a plurality of predetermined pager addresses from said received pager signals and generating a first digital word having a code uniquely corresponding to said decoded pager address of said plurality of predetermined pager addresses, and for decoding any one of a plurality of related predetermined address functions of said decoded pager address from said receiver pager signals and generating a second digital word having a code uniquely corresponding to said decoded address function of said plurality of address functions;

means governed by a third digital word to generate an alert signal having an annunciation pattern corresponding to an assignment code of said third digital word, said means rendered non-responsive when governed by an inhibit code of said third digital word; and non-volatile memory means for coupling to said decoder and said alert signal generating means and including a plurality of registers, each register of said plurality being programmable to store a codedword representing one of either an assignment code of said third digital word or an inhibit code of said third digital word, the programmed code of each register of said plurality being uniquely accessible as a code of said third digital word by the code of the first and second digital words for governing the operation of the alert signal generating means, whereby a pager may be individually and uniquely characterized by the programming of the non-volatile memory means to generate assigned alert annunciation patterns in response to selected decoded pager addresses and associated functions thereof and to inhibit alert generation in response to non-selected decoded pager addresses and associated functions thereof.

6. A multi-address pager receiver in accordance with claim 5 wherein the non-volatile memory means includes a read-only memory module individually programmed in accordance with the desired alert characteristics of its corresponding pager receiver.

7. A multi-address pager receiver in accordance with claim 5 including means for enabling the alert signal generating means responsive to the coded third digital word only when a pager address is decoded by the decoder.

8. A multi-address pager receiver in accordance with claim 7 wherein the decoder is further operative to generate an address detect signal when a pager address is decoded thereby; and wherein the enabling means includes a gating means, coupled between the alert signal generating means and the non-volatile memory means, and responsive to said address detect signal to gate the coded third digital word accessed from the memory means to the alert signal generating means.

* * * * *